United States Patent

Vicard et al.

Patent Number: 5,567,402
Date of Patent: Oct. 22, 1996

[54] METHOD OF CLEANING GASES CONTAINING ORGANIC POLLUTANTS

[76] Inventors: Jean-François Vicard, 17 Rue de la Charité, Lyon, France, 69002; Gilles Vicard, 45 bis Montée Saint-Laurent, Lyon, France, 69005

[21] Appl. No.: 137,202
[22] PCT Filed: May 6, 1992
[86] PCT No.: PCT/FR92/00408
§ 371 Date: Oct. 26, 1993
§ 102(e) Date: Oct. 26, 1993
[87] PCT Pub. No.: WO92/19364
PCT Pub. Date: Nov. 12, 1992

[30] Foreign Application Priority Data

May 7, 1991 [FR] France .................. 91.05853

[51] Int. Cl.⁶ ............... B01J 8/00; C01B 11/24
[52] U.S. Cl. .................. 423/245.2; 588/206
[58] Field of Search ............ 423/245.1, 245.2, 423/247, 240 R; 588/206

[56] References Cited

U.S. PATENT DOCUMENTS

| | | | |
|---|---|---|---|
| 3,977,966 | 8/1976 | Pradt et al. | 588/206 |
| 4,002,722 | 1/1977 | Suzuki et al. | 423/245.2 |
| 4,256,710 | 3/1981 | Azuma et al. | 423/245.2 |
| 4,699,667 | 10/1987 | Walsh | 134/12 |
| 5,160,707 | 11/1992 | Murray et al. | 423/245.2 |

FOREIGN PATENT DOCUMENTS

| | | |
|---|---|---|
| 0208490 | 1/1987 | European Pat. Off. |
| 0357960 | 3/1990 | European Pat. Off. |
| 0381601 | 8/1990 | European Pat. Off. |
| 7737504 | 7/1978 | France |
| 3224350 | 1/1984 | Germany |
| 3841858 | 10/1989 | Germany |
| 022320 | 2/1980 | Japan |
| 8911329 | 11/1989 | WIPO |

OTHER PUBLICATIONS

English Language Abstract of JP-A-55 022320.
English Language Abstract of WIPO 89/11329.

*Primary Examiner*—Gary P. Straub
*Attorney, Agent, or Firm*—Dowell & Dowell

[57] ABSTRACT

A method of cleaning gases includes introducing a gas containing organic pollutants into a scrubber and providing a scrubbing liquid. Finely divided solids capable of remaining substantially in suspension in the scrubbing liquid are introduced into the scrubbing liquid and the gas is wet scrubbed to remove the organic pollutants as dissolved gases and as particulate. A reagent capable of reacting, in combination with the finely divided solids, with the organic pollutants removed from the gas, is introduced into the scrubbing liquid to convert the removed pollutants into different compounds. A major portion of the scrubbing liquid is reused in the wet scrubbing.

28 Claims, 1 Drawing Sheet

METHOD OF CLEANING GASES CONTAINING ORGANIC POLLUTANTS

FIELD OF THE INVENTION

The present invention relates to methods of wet cleaning gases containing condensable pollutants, in particular organic pollutants.

HISTORY OF THE RELATED ART

For example in the case of household garbage incineration fumes, on the most modern incinerations after recovery of energy, i.e. at a temperature of about 180° to 250° C., gaseous organic pollutant contents, most often lying in the range 1 to 10 mg/m$^3$, may be measured (measurement of the total organic carbon by the flame ionization method). Among these organic pollutants, certain compounds form the subject matter of particular investigations due to their inherent toxicity: this is the case for polychlorodibenzo-p-dioxines (PCDD) and polychlorodibenzofuranes (PCDF) for which it is necessary to attain very low contents.

In order to collect these pollutants, several techniques have been proposed. The first technique consists of injecting in the gases an active carbon powder, ensuring a sufficient contact time between the powder and the gases, and then separating this active carbon powder like fly ash, in an electro-filter or in a sleeve filter. This method may be usefully combined with a semi-dry cleaning or a dry cleaning; in the latter case, the active carbon powder may be mixed with slaked lime powder before injection in the gases. This first technique is, however, limited in its application by several factors; the temperature of the gases must remain fairly high to avoid clogging and corrosion by condensation, which limits the possibilities of absorption; the presence of other pollutants consumes the absorption potential of the active carbon powder; and, finally, the mixture of the active carbon powder with the fly ash limits the maximum quantity of active carbon powder which may be injected.

In order to avoid the drawbacks and limitations of this first technique, a second technique has been proposed. It consists of cleaning the gases firstly down to very low values for the principal particulate and gaseous pollutants then in passing the gases to a filter comprising several layers of active carbon in granular form. This second technique involves the production of large complementary installations and it, too, is limited in its application by several factors; the temperature of the gases must not be too high due to the risks of inflammation of the large quantity of active carbon employed; it is necessary to renew the active carbon fairly often by reason of the presence of other pollutants which are absorbed and to limit the risks of inflammation; and, finally, the active carbon must, after use, be treated due to its composition.

In order to avoid these drawbacks and limitations, a third technique has been proposed. It consists of cleaning the gases firstly down to very low values for the principal particulate and gaseous pollutants except for the nitrogen oxides then in passing the gases to a filter constituted by catalysts identical to those used in the known processes of selective catalytic reduction of nitrogen oxides; An injection of $NH_3$ gas is performed for the selective reduction of the nitrogen oxides, but the quantity of catalysts is increased to allow the absorption and destruction of the dioxines and furanes: A variant consists of adding catalysts specifically designed for the destruction of the dioxines and furanes. This third technique involves the production of large complementary installations and it, too, is limited in its application by several factors: the temperature of the gases must remain fairly high to avoid poisoning of the catalysts by condensation of salt remaining gaseous if the temperature is fairly high; the prior cleaning of the gases must be thorough in order to avoid poisoning of the catalysts by specific elements, arsenic for example; finally, although this third technique has the advantage of destroying the dioxines and furanes, there is a risk of desorption before destruction under the effect of such or such upstream factor which is more or less well controlled.

Furthermore, the cleaning systems designed for the separation of the other pollutants may have a role—poorly controlled—with respect to these condensable organic pollutants; in dry and semi-dry systems with an electro-filter or filter with a sleeve, there is generally, by catalytic reaction, an increase of particular pollutants such as dioxines and furanes; and in the wet systems, there may be an increase or decrease, without, however, systematically obtaining extremely low residual contents.

BRIEF DESCRIPTION OF THE DRAWING

The drawing FIGURE is a flow diagram of a preferred embodiment of the method in accordance with the invention.

SUMMARY OF THE INVENTION

Figure 1:
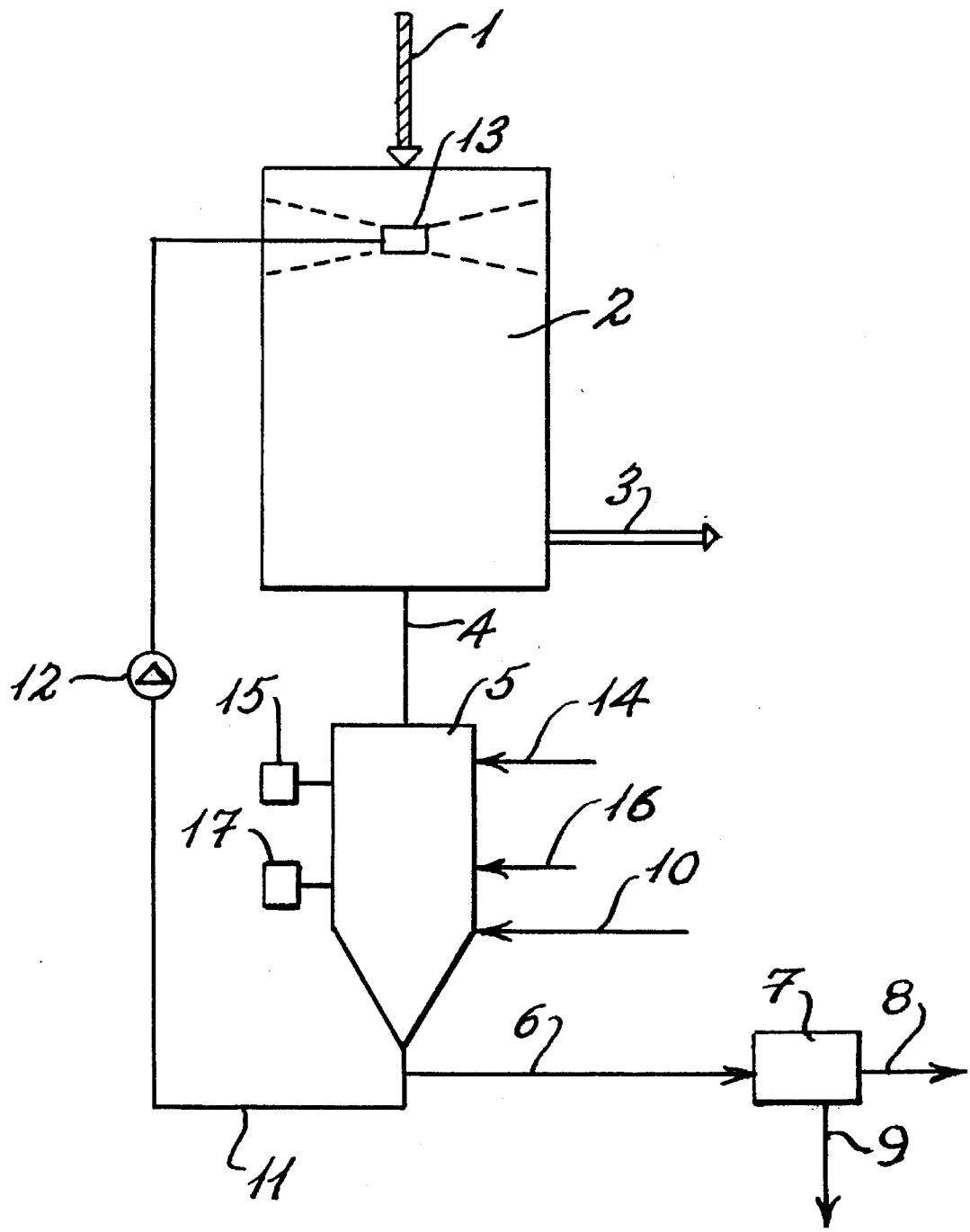

The present invention aims at overcoming the above-described drawbacks and limitations by providing a method of cleaning to ensure the collection of the condensable organic pollutants as well as the destruction thereof.

To that end, the gases are cleaned by a wet method which, according to the state of the art, firstly ensures soaking of the gases which provokes condensation of the condensable organic pollutants on the dust particles present in the gases or in the form of new fine particles, then the collection of all of these particles by transfer in the scrubbing liquid. According to the invention, the wet cleaning method is characterized by:

A) the introduction in the scrubbing liquid of an intermediate phase (for example in the form of a finely divided solid) immobilizing the condensable organic pollutants collected in order to avoid the pllutants being released again into the gases while awaiting the end of the reaction of destruction according to B) hereinafter and, B) the employment in the scrubbing liquid itself, at the level of the intermediate phase according to A) hereinabove, of reactions of destruction of condensable organic pollutants (by oxidation for example) possibly catalyzed by the intermediate phase according to A) hereinabove.

DETAILED DESCRIPTION OF THE INVENTION AND BRIEF DESCRIPTION OF DRAWING

The invention will now be described in detail in connection with FIG. 1 which gives a schematic representation of the method forming the subject matter of the invention.

The gases (1) to be cleaned are cleaned by a wet method which, according to the state of the art, ensures separation of the gaseous and particulate pollutants at the level of cleaning sought after for the cleaned gases (3). Such a wet method is employed using to a scrubber (2) where the gases are contacted by a recycled scrubbing liquid (11) sent via a pump (12) into sprays (13) which distribute the recycled scrubbing liquid in the gases. The recycled scrubbing liquid (11) atomized in the scrubber (2), after contact with the gases is recovered (4) in a tank (5) which is often arranged in the base of the scrubber (2). A small portion (6) of the recovered scrubbing liquid (4) is directed to a treatment station (7). The collected pollutants are separated in the form of solid residue (9) while the clear water (8) is rejected in the natural medium or recycled in the tank (5). An addition of water (10) compensates for consumptions, in particular due to the evaporation in the scrubber (2). In general, the contact between the gases and the scrubbing liquid (10) brings these gases to conditions close to water-vapour saturation. The gases are thus soaked and their temperature generally becomes very rapidly slightly higher than the wet temperature of the gases (1) to be cleaned. This results in a condensation of the condensable organic pollutants on the dust particles present in the gases (1) or in the form of new fine particles. The scrubber (2) is dimensioned to ensure collection of these particles to attain the level of cleaning required for the cleaned gases (3). Experience shows that the particles collected by transfer in the scrubbing liquid remain in the liquid in the case of inorganic pollutants but for numerous organic pollutants, there is a tendency for release in the cleaned gases (3), such release being greater as the concentration in the scrubbing liquid is high. The obtaining of a high level of cleaning imposes a considerable flowrate of scrubbing liquid (10) which it is not possible for technical and economical reasons to treat like the recovered scrubbing liquid (6). According to the invention, an intermediate phase is constituted in the recycled scrubbing liquid (11) by injecting material (14) for example in the tank (5) which material is capable of immobilizing the condensable organic pollutants collected. The material (14) may be a finely divided solid such as for example active carbon powder. To determine the quantity of material (14) to be injected, the content of non-immobilized organic pollutants is assessed (15) by measuring for example the total organic carbon content of the liquid phase. This assessment may be made either periodically and the rate of injection is adjusted manually a priori, taking a reasonable safety margin, or continuously and the rate of injection is automatically adjusted. However, it is also necessary to destroy the collected and immobilized organic pollutants if it is not desired to attain excessive consumptions of the material (14). To that end, a reaction of destruction of these organic pollutants is carried out in the scrubbing liquid itself, at the level of the intermediate phase by introducing a reagent (16) which may react with the organic pollutants. In general, the most appropriate reaction is a reaction of oxidation, for example with hydrogen peroxide $H_2O_2$, and which may benefit from a catalytic effect of the intermediate phase. To determine the quantity of reagent (16) to be injected, its real content in the liquid is assessed (17). For example, in the case of a reaction of oxidation, the dissolved oxygen of the liquid phase is measured. This assessment may be made either periodically and the rate of injection is adjusted manually a priori, taking a reasonable safety margin, or continuously and the rate of injection is automatically adjusted. In the case of a reaction of oxidation, it may be desirable, instead of consuming a reagent such as hydrogen peroxide, to use oxygen dissolved naturally in the scrubbing liquid during its contact with the gases. Injection of reagent (16) is then obtained by this dissolution and it is the flow of scrubbing liquid which is then adjusted to maintain the real dissolved oxygen at the required level. In the same manner, in the case of gases produced from processes of combustion, it is possible for this process to work so that the intermediate phase is constituted by the dusts emitted and contained in the gases (1), in particular the unburnt products. It may also be preferable, from a practical point of view, to inject the material (14), not in the tank (5), but in the gases (1) to be cleaned, upstream of the scrubber (2).

The quantities and natures of the condensable organic pollutants vary from one site of application to another, and it is necessary for each site to associate, experimentally, the content of condensable organic pollutants in the cleaned gases (3) with the assessments (15 and 16).

The following is an example of the use of the method of the invention. For household garbage incineration gases, the method of the invention was carried out on a scrubber to achieve a very thorough cleaning on the following pollutants:

dusts—less than 1 $mg/Nm^3$

HCl—less than 1 $mg/Nm^3$ $SO_2$—less than 20 $mg/Nm^3$

For the condensable organic pollutants, attention was given to the specific toxic pollutants, dioxines and furanes.

By injecting 20 kg/h of active carbon powder having a specific surface of 1000, the following was obtained:

a rate of destruction greater than 90% a collection output (with oxidation by the gases) greater than 99% a collection output (with oxidation with hydrogen peroxide) greater than 99.8%.

It must, moreover, be understood that the foregoing description has been given only by way of example and that it in no way limits the domain of the invention which would not be exceeded by replacing the details of execution described by any other equivalents. This is why, insofar as such changes, modifications or re-arrangements are obvious for a man skilled in the art, they are considered as belonging totally to the present invention.

We claim:

1. A method of removing organics contained in combustion gases comprising the steps of:

providing combustion gases containing organics;

introducing finely divided solids selected from the group consisting of powders of activated carbon, titanium oxide, alumina, iron oxide and silica into said combustion gases;

providing a scrubber and a scrubbing liquid;

introducing said combustion gases and said scrubbing liquid into said scrubber, said finely divided solids remaining substantially in suspension in said scrubbing liquid during movement of said scrubbing liquid;

wet scrubbing said combustion gases with said scrubbing liquid to remove said organics;

introducing a reagent selected from the group consisting of hydrogen peroxide and ozone directly into said scrubbing liquid, said reagent reacting, in combination with said finely divided solids, with said organics removed from said gases, to oxidize the removed organics;

reusing directly in said wet scrubbing a major portion of said scrubbing liquid having said finely divided solids suspended therein; and bleeding a small portion of said scrubbing liquid to an effluent treatment plant.

2. The method of claim 1, wherein said small portion of said scrubbing liquid contains said finely divided solids.

3. The method of claim 1, wherein said finely divided solids comprise iron oxide powder.

4. The method of claim 1, wherein said finely divided solids comprise activated carbon powder.

5. The method of claim 4, wherein said reagent is ozone.

6. The method of claim 4, further comprising the step of measuring the content of dissolved organics in said scrubbing liquid and adjusting the introduction of said activated carbon powder into said scrubbing liquid, the amount of said activated carbon powder introduced being increased as said content of dissolved organics in said scrubbing liquid is increased.

7. The method of claim 4, further comprising the step of measuring the content of said reagent in said scrubbing liquid and adjusting the introduction of said reagent into said scrubbing liquid, the amount of reagent introduced being increased as said content of said reagent in said scrubbing liquid is decreased.

8. The method of claim 4, further comprising the steps of measuring the content of dissolved organics in said scrubbing liquid and adjusting the introduction of said activated carbon powder into said scrubbing liquid, the amount of said activated carbon powder introduced being increased as said content of dissolved organics in said scrubbing liquid is increased, and measuring the content of said reagent in said scrubbing liquid and adjusting the introduction of said reagent into said scrubbing liquid, the amount of reagent introduced being increased as said content of said reagent in said scrubbing liquid is decreased.

9. A method of removing organics contained in combustion gases, comprising the steps of:

introducing combustion gases containing organics into a scrubber;

providing a scrubbing liquid;

introducing separately from said combustion gases finely divided solids selected from the group consisting of powders of activated carbon, titanium oxide, alumina, iron oxide and silica directly into said scrubbing liquid, said finely divided solids remaining substantially in suspension during movement of said scrubbing liquid;

wet scrubbing said combustion gases with said scrubbing liquid to remove said organics;

introducing separately from said combustion gases a reagent selected from the group consisting of ozone and hydrogen peroxide into said scrubbing liquid in said scrubber, the reagent reacting, in combination with said finely divided solids, with said organics removed from said combustion gases, to oxidize the removed organics;

reusing directly in said wet scrubbing a major portion of said scrubbing liquid having said finely divided solids suspended therein; and bleeding a small portion of said scrubbing liquid to an effluent treatment plant.

10. The method of claim 4, wherein said finely divided solids comprise activated carbon powder, and further comprising the step of measuring the content of said dissolved organics in said scrubbing liquid and adjusting the introduction of said activated carbon powder into said scrubbing liquid, the amount of activated carbon powder introduced being increased as said content of said dissolved organics in said scrubbing liquid is increased.

11. A method of removing organic pollutants contained in gases, comprising the steps of:

introducing gases containing organic pollutants into a scrubber;

providing a scrubbing liquid;

introducing finely divided solids into said scrubbing liquid, said finely divided solids remaining substantially in suspension during movement of said scrubbing liquid;

wet scrubbing said gases with said scrubbing liquid to remove said organic pollutants;

introducing a reagent into said scrubbing liquid, said reagent reacting, in combination with said finely divided solids, with said organic pollutants removed from said gas, to convert the removed organic pollutants into different compounds;

reusing directly in said wet scrubbing a major portion of said scrubbing liquid having said finely divided solids suspended therein; and bleeding a small portion of said scrubbing liquid to an effluent treatment plant.

12. The method of claim 11, wherein the reaction is an oxidation reaction.

13. The method of claim 11, wherein said finely divided solids and said reagent are introduced into said scrubbing liquid in said scrubber.

14. A method of removing organics contained in combustion gases, comprising the steps of:

introducing combustion gases containing organics into a scrubber;

providing a scrubbing liquid;

introducing separately from said combustion gases finely divided solids selected from the group consisting of powders of activated carbon, titanium oxide, alumina, iron oxide and silica into said scrubbing liquid in said scrubber, said solids remaining substantially in suspension during movement of said scrubbing liquid;

wet scrubbing said combustion gases with said scrubbing liquid to remove said organics;

dissolving oxygen into said scrubbing liquid in said scrubber, the dissolved oxygen reacting, in combination with said finely divided solids, with said organics removed from said combustion gases, to oxidize the removed organics;

reusing directly in said wet scrubbing a major portion of said scrubbing liquid having said finely divided solids suspended therein; and bleeding a small portion of said scrubbing liquid to an effluent treatment plant.

15. The method of claim 14, wherein said small portion of said scrubbing liquid contains said finely divided solids.

16. The method of claim 14, wherein said finely divided solids comprise activated carbon powder.

17. The method of claim 16, wherein said combustion gases contain oxygen and oxygen is dissolved in said scrubbing liquid from said combustion gases.

18. The method of claim 17, wherein said combustion gases are waste incineration gases.

19. The method of claim 14, wherein said combustion gases contain oxygen and oxygen is dissolved in said scrubbing liquid from said combustion gases.

20. The method of claim 14, further comprising the step of measuring the content of dissolved organics in said scrubbing liquid and adjusting the introduction of said finely divided solids into said scrubbing liquid, the amount of finely divided solids introduced being increased as said content of dissolved organics in said scrubbing liquid is increased.

21. The method of claim 14, further comprising the step of measuring the content of said dissolved oxygen in said scrubbing liquid and adjusting the flow of said scrubbing liquid, the flow of said scrubbing liquid being increased as said content of dissolved oxygen in said scrubbing liquid is decreased.

22. The method of claim 14, further comprising the step of measuring the content of dissolved organics in said scrubbing liquid and adjusting the introduction of said finely divided solids into said scrubbing liquid, the amount of said finely divided solids introduced being increased as said content of dissolved organics in said scrubbing liquid is increased, and measuring the content of said dissolved oxygen in said scrubbing liquid and adjusting the flow of said scrubbing liquid, the flow of said scrubbing liquid being increased as said content of said dissolved oxygen in said scrubbing liquid is decreased.

23. The method of claim 14, wherein said solids are introduced in said combustion gases upstream of said scrubber.

24. A method of removing organics contained in combustion gases, comprising the steps of:

providing combustion gases containing organics;

introducing finely divided solids selected from the group consisting of powders of activated carbon, titanium oxide, alumina, iron oxide and silica into said combustion gases;

providing a scrubber and a scrubbing liquid;

introducing said combustion gases and said scrubbing liquid into said scrubber, said finely divided solids remaining substantially in suspension in said scrubbing liquid during movement of said scrubbing liquid;

wet scrubbing said combustion gases with said scrubbing liquid to remove said organics;

dissolving oxygen into said scrubbing liquid in said scrubber, said dissolved oxygen reacting, in combination with said finely divided solids, with said organics removed from said combustion gases, to oxidize the removed organics;

reusing directly in said wet scrubbing a major portion of said scrubbing liquid having said finely divided solids suspended therein; and bleeding a small portion of said scrubbing liquid to an effluent treatment plant.

25. The method of claim 24, wherein said finely divided solids comprise activated carbon powder and said combustion gases contain oxygen, and further comprising the step of measuring the content of dissolved oxygen in said scrubbing liquid and adjusting the flow of said scrubbing liquid, the flow of said scrubbing liquid being increased as said content of said dissolved oxygen in said scrubbing liquid is decreased.

26. The method of claim 24, wherein said finely divided solids comprise activated carbon powder, and further comprising the steps of measuring the content of said dissolved organics in said scrubbing liquid and adjusting the introduction of said activated carbon powder into said scrubbing liquid, the amount of said activated carbon powder introduced being increased as said content of said dissolved organics in said scrubbing liquid is increased, and measuring the content of dissolved oxygen in said scrubbing liquid and adjusting the flow of said scrubbing liquid, the flow of said scrubbing liquid being increased as said content of said dissolved oxygen in said scrubbing liquid is decreased.

27. The method of claim 24, wherein said reagent comprises hydrogen peroxide or ozone.

28. The method of claim 24, wherein said combustion gases contain oxygen which is dissolved in said scrubbing liquid.

\* \* \* \* \*